(12) United States Patent
Murakami et al.

(10) Patent No.: US 11,072,527 B2
(45) Date of Patent: Jul. 27, 2021

(54) METHOD FOR PRODUCING CHLORINE BY OXIDATION OF HYDROGEN CHLORIDE

(71) Applicant: MITSUI CHEMICALS, INC., Tokyo (JP)

(72) Inventors: Masami Murakami, Ichihara (JP); Hideharu Kuwamoto, Chiba (JP); Kenji Iwata, Yokohama (JP)

(73) Assignee: MITSUI CHEMICALS, INC., Tokyo (JP)

( * ) Notice: Subject to any disclaimer, the term of this patent is extended or adjusted under 35 U.S.C. 154(b) by 63 days.

(21) Appl. No.: 16/464,118

(22) PCT Filed: Nov. 29, 2017

(86) PCT No.: PCT/JP2017/042895
§ 371 (c)(1),
(2) Date: May 24, 2019

(87) PCT Pub. No.: WO2018/101357
PCT Pub. Date: Jun. 7, 2018

(65) Prior Publication Data
US 2019/0292049 A1    Sep. 26, 2019

(30) Foreign Application Priority Data

Dec. 2, 2016  (JP) .............................. JP2016-234798

(51) Int. Cl.
| *C01B 7/04* | (2006.01) |
| *B01J 23/83* | (2006.01) |
| *B01J 37/02* | (2006.01) |
| *B01J 21/08* | (2006.01) |
| *B01J 37/14* | (2006.01) |
| *B01J 35/02* | (2006.01) |
| *B01J 35/10* | (2006.01) |

(52) U.S. Cl.
CPC ................. *C01B 7/04* (2013.01); *B01J 21/08* (2013.01); *B01J 23/83* (2013.01); *B01J 35/026* (2013.01); *B01J 35/1023* (2013.01); *B01J 35/1047* (2013.01); *B01J 35/1061* (2013.01); *B01J 37/0217* (2013.01); *B01J 37/0221* (2013.01); *B01J 37/0236* (2013.01); *B01J 37/14* (2013.01)

(58) Field of Classification Search
CPC .................... C01B 7/04; B01J 23/83
See application file for complete search history.

(56) References Cited

U.S. PATENT DOCUMENTS

| 3,260,678 A | 7/1966 | Engel |
| 3,483,136 A | 12/1969 | Van Der Plas |
| 5,707,919 A * | 1/1998 | Miyata ................... B01J 23/885 502/319 |
| 5,871,707 A | 2/1999 | Hibi |
| 5,908,607 A | 6/1999 | Abekawa |
| 6,977,066 B1 | 12/2005 | Iwanaga |
| 2005/0031529 A1 | 2/2005 | Hibi |
| 2005/0175528 A1 | 8/2005 | Walsdorff |
| 2010/0196255 A1* | 8/2010 | Horiuchi .................. B01J 35/10 423/502 |
| 2012/0009117 A1 | 1/2012 | Nabeta |
| 2012/0258856 A1 | 10/2012 | Horiuchi et al. |
| 2013/0177494 A1 | 7/2013 | Wolf |
| 2013/0216470 A1 | 8/2013 | Wolf |
| 2013/0288884 A1* | 10/2013 | Yi .............................. C01B 7/04 502/73 |

FOREIGN PATENT DOCUMENTS

| EP | 2481478 A1 | 8/2012 |
| JP | H0967103 A | 3/1997 |
| JP | H09142806 A | 6/1997 |
| JP | H10194705 A | 7/1998 |
| JP | 11180701 A | 7/1999 |
| JP | 2000272907 A | 10/2000 |
| JP | 2005219948 A | 8/2005 |
| JP | 2005532245 A | 10/2005 |
| JP | 2007007521 A | 1/2007 |
| JP | 2009248044 A | 10/2009 |
| JP | 2010227794 A | 10/2010 |
| JP | 2012-62235 A | 3/2012 |
| JP | 2013536074 A | 9/2013 |
| JP | 2013536075 A | 9/2013 |
| WO | 2005075346 A1 | 8/2005 |
| WO | 2010110392 A1 | 9/2010 |

OTHER PUBLICATIONS

PCT International Preliminary Report on Patentability (Form PCT/IB/373) filed in PCT/JP2017/042895, with PCT Notification Concerning Transmittal of International Preliminary Report on Patentability (Form PCT/IB/326) dated Jun. 4, 2019.
PCT International Preliminary Report on Patentability (Form PCT/IB/373) filed in PCT/JP2017/042895, with PCT Notification of Transmittal of Translation of the International Preliminary Report on Patentability (Form PCT/IB/338) dated Jun. 4, 2019.
International Search Report dated Feb. 20, 2018 filed in PCT/JP2017/042895.
Extended European Search Report (EESR) dated Jul. 22, 2020 issued in the corresponding European Patent Application No. 1787-6277.9.

* cited by examiner

*Primary Examiner* — Ngoc-Yen Nguyen
(74) *Attorney, Agent, or Firm* — Rankin, Hill & Clark LLP

(57) ABSTRACT

The method for producing chlorine by oxidation of hydrogen chloride with oxygen in the presence of a catalyst in a fixed-bed reactor, wherein [I] a material containing hydrogen chloride and oxygen is allowed to contact a catalyst in a temperature range of 280 to 370° C., and [II] the material containing hydrogen chloride and oxygen has an oxygen concentration of 45 to 75 vol %.

6 Claims, No Drawings

METHOD FOR PRODUCING CHLORINE BY OXIDATION OF HYDROGEN CHLORIDE

TECHNICAL FIELD

The present invention relates to a method for producing chlorine by oxidation of hydrogen chloride with a metal-containing catalyst.

BACKGROUND ART

Chlorines are useful as materials for vinyl chloride and phosgene. Chlorines can be produced by, for example, mainly chloralkali process, or oxidation of hydrogen chloride with a catalyst.

The chloralkali process is disadvantageous in terms of energy, because it involves a lot of electric power, and also it byproduces sodium hydroxide, and therefore balance of these has to be considered.

Meanwhile, production of chlorine by oxidation of hydrogen chloride with a catalyst uses hydrogen chloride as a material obtained in processes in which hydrogen chloride is byproduced, such as production of vinyl chloride and phosgene, and therefore in view of effective use of by-products, it is advantageous.

In the above-described chlorine production from hydrogen chloride by oxidation of hydrogen chloride with a catalyst, the reaction is exothermic reaction, and the temperature affect the equilibrium conversion rate, thus it is advantageous to carry out the procedure under lower temperature. For the catalyst used in this reaction, a Deacon catalyst mainly composed of copper, a $Cr_2O_3/SiO_2$ catalyst, and a $Ru/TiO_2$ catalyst are known (see, for example. Patent Document 1).

Examples of the Deacon catalyst mainly composed of copper include a catalyst with a silica gel carrier having a specific surface area of 200 $m^2/g$ or more and an average pore diameter of 60 Å or more on which copper chloride, alkali metal chloride, and rare earth chlorides such as didymium chloride are supported (for example, see Patent Document 2), and a fluidized bed catalyst prepared by immersing silica gel having a specific surface area of 410 $m^2/g$ and a pore volume of 0.72 ml/g in copper, potassium, and didymium (for example, see Patent Document 3).

However, these catalysts have advantages and disadvantages. With the Deacon catalyst and $Cr_2O_3/SiO_2$ catalyst, the active components are cheap, but because they have insufficient activities, reaction at high temperature is necessary. The reaction of hydrochloric acid oxidation is exothermic reaction, and involves reaction equilibrium, and therefore a high temperature causes a low conversion rate. Meanwhile, the $RuO_2/TiO_2$ catalyst is highly active even if a small amount is supported, but noble metal has to be collected and recycled from the spent catalyst, and also with recent increase in demand for Ru increasing its price, it is disadvantageous in terms of stable supply and costs.

The didymium is a mixture containing various rare earth elements, and because it is a mixture, its composition lacks consistency depending on where and when it is mined, and therefore with the catalyst in which didymium is used, activity is not constant and stable use cannot be achieved.

Furthermore, in Patent Document 2, although activity evaluation is carried out with various rare earth elements, the evaluation is carried out under conditions of lower space velocity, and therefore the catalyst has fewer burdens and the equilibrium conversion rate is reached in most catalysts, thus differences in reaction activities between the lanthanoids cannot be found.

The inventors of the present invention have found that a copper-based catalyst containing a specific lanthanoid element is an excellent catalyst for producing chlorine by oxidation of hydrogen chloride (for example, see Patent Document 4).

CITATION LIST

Patent Document

Patent Document 1: Japanese Unexamined Patent Publication No. Hei 9-67103
Patent Document 2: U.S. Pat. No. 3,260,678
Patent Document 3: U.S. Pat. No. 3,483,136
Patent Document 4: Japanese Unexamined Patent Publication No. 2010-227794

SUMMARY OF THE INVENTION

Problem to be Solved by the Invention

The above-mentioned catalyst, in particular, the catalyst containing copper has excellent catalytic performance. However, examination by the inventors of the present invention revealed that in a long run test with a reaction temperature of over around 400° C., a portion of the catalyst component volatilized over time even it is a solid catalyst. Therefore, when, for example, this catalyst is commercially used as a fixed-bed catalyst, it is highly possible that the catalyst has to be replaced with a short cycle. Also, there is a concern that the volatilized component deposits in any piping during the process.

To reduce the volatilization, decrease in the reaction temperature may be effective. The decrease in the reaction temperature also means, because oxidation reaction of hydrogen chloride is equilibrium reaction (exothermic), that it may be advantageous in terms of equilibrium conversion rate. However, another problem with the conditions of low reaction temperature is found: reaction activities (in the following, may be simply referred to as activity) may be reduced over time. The problem also raises the concern of necessitating a short term replacement and activation of a catalyst in industrial operation.

Means for Solving the Problem

The inventors of the present invention earnestly conducted researches to solve the above-described problems. That is, they assumed that the reduction of reaction activities over time is caused by the following. For example, when the catalyst contains a copper element, it goes through a catalyst reaction cycle: the divalent copper, i.e., the main catalyst component, is reduced to monovalent by oxidation reaction of hydrogen chloride, and then reacted with oxygen to be oxidated to be divalent again. In the cycle, the oxidation reaction of the monovalent copper is easily affected by the reaction temperature, and is relatively slower than the oxidation reaction of hydrogen chloride under low temperature, and therefore activity is reduced over time. Based on the above, it was found that under a specific reaction temperature region, the following method involves less changes in activity over time, and it can be an industrially suitable method for producing chlorine, achieving the present invention: a method for producing chlorine by oxidation of hydrogen chloride under specific oxygen concentration conditions in the presence of a catalyst, particularly a catalyst containing a copper element, an alkali metal element, and a rare earth metal element.

That is, the present invention includes the following.

The present invention [1] includes a method for producing chlorine by oxidation of hydrogen chloride with oxygen in the presence of a catalyst in a fixed-bed reactor, wherein [I] a material containing hydrogen chloride and oxygen is allowed to contact a catalyst in a temperature range of 280 to 370° C., and [II] the material containing hydrogen chloride and oxygen has an oxygen concentration of 45 to 75 vol %.

The present invention [2] includes the method for producing chlorine described in [1] above, wherein the hydrogen chloride is fed at a speed of 65 to 1500 L/h relative to 1 L of the catalyst.

The present invention [3] includes the method for producing chlorine described in [1] or [2] above, wherein the catalyst contains a copper element, an alkali metal element, and a rare earth metal element.

The present invention [4] includes the method for producing chlorine described in [3] above, wherein setting the mass of the catalyst as a whole as 100 mass %, the catalyst has a copper element content of 1.0 mass % or more, 12.0 mass % or less, the mass ratio of the copper element to the alkali metal element is in the range of 1:0.2 to 1:2.0, and the mass ratio of the copper element to the rare earth metal element is in the range of 1:0.2 to 1:3.0.

The present invention [5] includes the method for producing chlorine described in [3] or [4] above, wherein the rare earth metal element contained in the catalyst is at least one selected from the group consisting of praseodymium, neodymium, samarium, and europium.

The present invention [6] includes the method for producing chlorine described in any one of the above-described [3] to [5], wherein the alkali metal element contained in the catalyst includes sodium and/or potassium.

The present invention [7] includes the method for producing chlorine described in any one of the above-described [3] to [6], wherein the catalyst containing a copper element, an alkali metal element, and a rare earth metal element is obtained by immersing an inorganic porous carrier inactive to chlorine and hydrogen chloride in an aqueous solution of metal salt of each or a mixture of the elements contained in the catalyst, and then the carrier immersed in the aqueous solution of metal salt was dried at 80 to 200° C. for 2 to 24 hours to remove free moisture content, and further allowing the carrier immersed in the metal salt to stand in an atmosphere containing no reductive gas with an oxygen concentration of 15 to 95 vol % at 300 to 390° C. for 5 to 20 hours.

Effects of the Invention

In the method for producing chlorine of the present invention, a catalyst, particularly a catalyst containing a copper element, an alkali metal element, and a rare earth element carried on preferably silica is disposed as a fixed-bed and hydrogen chloride and oxygen are subjected to oxidation reaction under specific conditions: this method allows for less reduction in activity over time and particularly highly efficient operation in industrial production of chlorine even under relatively low temperature, in which volatilization of a catalyst is not very easy. Thus, contribution of the present invention to the industry is high.

DESCRIPTION OF THE EMBODIMENTS

In the method for producing chlorine of the present invention, a catalyst, particularly a catalyst containing a copper element, an alkali metal element, and a rare earth element carried on preferably silica is disposed as a fixed-bed, and hydrogen chloride and oxygen are subjected to oxidation reaction at a specific temperature under oxygen concentration conditions.

In the following, the present invention is described in details.

For the catalyst used in the present invention, for example, a copper-based catalyst component containing a copper element, an alkali metal element, and a rare earth element; a chromium-based catalyst component containing chromium oxide; and a ruthenium-based catalyst component containing ruthenium oxide are used, and preferably, the copper-based catalyst component is used. A case where the catalyst is a copper-based catalyst component is described below.

(Copper-Based Catalyst Component)

The copper-based catalyst component used in the present invention (catalyst for chlorine production) is a catalyst containing a copper element, an alkali metal element, and a rare earth element carried on preferably silica. The components are described below.

[Rare Earth Element]

The rare earth element used in the copper-based catalyst component of the present invention is preferably lanthanoids, i.e., elements of lanthanides: a general term for 15 elements from lanthanum (atom number: 57) to lutetium (atom number: 71) of the periodic table (IUPAC Periodic Table of the Elements (version date 8 Jan. 2016).

The catalyst for chlorine production of the present invention is further preferably lanthanoids having a bond-dissociation energy of lanthanoid and oxygen of 100 to 185 kcal/mol at 298K. When a catalyst containing lanthanoid having a bond-dissociation energy of lanthanoid and oxygen of the above-described range is used in the present invention, hydrogen chloride can be oxidated with high activity. Such effects are presumably because the lanthanoid having the bond-dissociation energy within the above-described range is less affected by the reaction conditions and keeps suitable affinity with oxygen. The rare earth element of the present invention can be used singly, or can be used in combination. Of the lanthanoids having a bond-dissociation energy within the above-described range, praseodymium, neodymium, samarium, europium, gadolinium, terbium, and dysprosium are preferably used, and praseodymium, neodymium, samarium, and europium allows for stable oxidation of hydrogen chloride with higher activity, even more preferably, samarium is more preferable because it can stably supplied with low costs.

Needless to say, lanthanoid (for example, lanthanum and cerium) having no bond-dissociation energy with oxygen of 100 to 185 kcal/mol, and also rare earth elements other than lanthanoids (scandium and yttrium) can also be contained.

[Copper Element]

The copper element contained in the catalyst for chlorine production (copper-based catalyst component) of the present invention can contain any of a monovalent and divalent copper element. Of these, the divalent copper content is preferably high.

[Alkali Metal Element]

Examples of the alkali metal element contained in the catalyst for chlorine production (copper-based catalyst component) of the present invention include lithium, sodium, potassium, rubidium, caesium, and francium. These alkali metals can be used singly, or can be used in combination. Of these, sodium and potassium are preferable, and potassium is more preferable because it allows for production of a highly active catalyst. Use of potassium allows for production of a highly active catalyst probably because it causes affinity between oxygen and lanthanoid to be excellent.

[Catalyst for Chlorine Production]

The catalyst for chlorine production used in the present invention (copper-based catalyst component) is a catalyst used when chlorine is produced by oxidation of hydrogen chloride in the presence of oxygen, and contains a copper element, an alkali metal element, and a rare earth metal element (rare earth element).

The catalyst for chlorine production of the present invention contains, relative to 100 mass % of the catalyst for chlorine production (setting the mass of the catalyst as a whole to 100 mass %), a copper element of preferably 1.0 to 12.0 mass %, more preferably 1.2 to 10.0 mass %, even more preferably 1.5 to 9.0 mass % (that is, copper element content is within the range), the mass ratio (copper element:lanthanoid) of the copper element to lanthanoid (rare earth element) is preferably 1:0.2 to 1:3.0, more preferably 1:0.3 to 1:2.5, even more preferably 1:0.5 to 1:2.0, and the mass ratio (copper element:alkali metal element) of the copper element to alkali metal element is preferably 1:0.2 to 1:2.0, more preferably 1:0.3 to 1:1.8. In the above-described range, the elements are easily made into a composite, and the catalyst tends to be highly active.

The pore structure of the catalyst is not particularly limited, but the total pore volume is preferably 0.2 to 2.0 ml/g. The total pore volume is even more preferably 0.3 to 1.9 ml/g. The average pore diameter is not particularly limited, but preferably 5 to 60 nm. The average pore diameter is even more preferably 6 to 55 nm. The pore structure is related to diffusion and migration of the reactant and product. With a large pore structure, the diffusion is fast but the reaching frequency to the catalyst surface may be reduced, and with a small pore structure, the diffusion may be slow in turn. The catalyst has a specific surface area of generally 50 $m^2/g$ to 550 $m^2/g$, preferably 60 $m^2/g$ to 500 $m^2/g$. A larger specific surface area is preferable because it increases the active site, but with the increase in the specific surface area, the pore structure is susceptible to collapsing, and therefore it is preferably in the above-described range.

In the catalyst for chlorine production of the present invention, the above-described active component is generally carried by a carrier. For the carrier that allows dispersion and carries the active component, preferably, an inorganic porous carrier inactive to hydrogen chloride and chlorine is used.

The carrier can be particles, granular, or various molded product, but to homogenously disperse and carry the active component, it is preferably particles. Examples of the carrier material include silica, silica alumina, titania, and zirconia, and silica is particularly preferable. For the silica carrier, any of the generally in-store silica gel and fumed silica can be used. The catalyst for chlorine production has a carrier content of, relative to 100 mass % of the catalyst, generally 99 to 65 mass %, preferably 97 to 69 mass %, more preferably 94 to 72 mass %. The above-described range is preferable because it allows for achievement of both activity and strength of the catalyst.

The catalyst of the present invention may contain a component (other component) other than the above-described active component and carrier. Examples of such components include a palladium element, iridium element, chromium element, vanadium element, niobium element, and alkaline earth metal element. When these other components are contained, they are contained in the range of generally 0.01 to 10 parts by mass relative to 100 parts by mass of the carrier.

[Method for Producing Catalyst for Chlorine Production]

The production method of the catalyst for chlorine production of the present invention is not particularly limited, but for example, it can be made with the following method.

The method for producing the catalyst of the present invention includes a step of dispersing a copper compound, alkali metal compound, and lanthanoid compound on a carrier, and preferably includes a step of drying or baking/calcining the carrier on which a copper compound, alkali metal compound, and a lanthanoid compound are dispersed at a room temperature to 600° C.

In the above-described production method, the active component of copper element, alkali metal element, and lanthanoid are dispersed on carrier as the copper compound, alkali metal compound, and lanthanoid compound, respectively. The copper compound, alkali metal compound, and lanthanoid compound can be any compound, but generally is a metal salt, and can be, independently, a halogenated product, nitrate, sulfate, acetate, carbonate, oxalic acid salt, alkoxide or a complex salt. The carrier with an average pore diameter of 5 to 60 nm, a total pore volume of 0.3 to 2.5 ml/g, and a specific surface area of 50 $m^2/g$ to 600 $m^2/g$ is preferably used, and the carrier with an average pore diameter of 6 to 60 nm, a total pore volume of 0.4 to 2.0 ml/g, and a specific surface area of 70 $m^2/g$ to 570 $m^2/g$ is more preferably used.

The method for dispersing the active components on the carrier is not particularly limited. The above-described elements can be subjected to vapor deposition in a vacuum chamber, can be carried by gas phase method, or by liquid phase method. However, in view of operativity and homogenous dispersion, the above-described elements are preferably carried on the carrier by liquid phase method. When the above-described elements are to be carried by liquid phase method, a compound containing the active components is added to a solvent to prepare a material dispersion liquid in which material solutions or materials are dispersed in the solvent. Thereafter, the material dispersion liquid can be sprayed over a catalyst carrier, or the catalyst carrier can be immersed in the material solution or material dispersion liquid, and then the material solution and the material dispersion liquid can be stirred to be evaporated to dryness. Alternatively, the catalyst carrier can be immersed in the material solution or material dispersion liquid, and then the catalyst carrier is taken out from the material solution or material dispersion liquid, then subjected to drying. When the catalyst carrier is immersed in the material solution or material dispersion liquid to disperse the active components to be carried on the catalyst carrier, and when the amount of the active components carried on the catalyst carrier is small, the catalyst carrier can be immersed again in the material solution or material dispersion liquid to increase the active component content. The active component in the material solution or material dispersion liquid can be in a state of solid without being dissolved in the solvent, as long as it is a size that can go into the pores of the carrier, but to homogenously disperse the active component in the pores, the active components are preferably dissolved in the solvent, that is, it is preferably in a state of the material solution.

In the catalyst for chlorine production used in the present invention produced by dispersing the active components on the carrier, the amount of solvent remained in the catalyst derived from the material solution or material dispersion liquid is smaller than the pore volume of the catalyst. When the amount of the solvent remained in the catalyst is larger than the pore volume of the catalyst, after the catalyst in which the active component is dispersed is loaded in a reactor, at the time when the solvent exposed at the catalyst surface evaporates or volatilizes from the catalyst surface, the active component may migrate, which may cause the amount of the active component carried on the catalyst carrier to be inconsistent. With the amount of solvent remained in the catalyst smaller than the pore volume of the catalyst, even if the solvent is contained in the catalyst, the active component is kept in fixed state in the catalyst pores while the surface is dry, and therefore the amount carried tends to be constant and stay unchanged.

The solvent for the active components when the active components are carried on the catalyst carrier by the liquid phase method is not particularly limited, as long as it can dissolve or disperse the compound containing the active component. However, in view of easy handling, water is preferable. The active component can be dissolved or dispersed in the solvent at a concentration without particular limitation as long as the compound of the active component can be dissolved or dispersed homogenously. However, with a concentration too low, it takes time to achieve the carrying, and therefore the active component amount relative to 100 mass % of a total of the active component and the solvent is preferably 1 to 50 mass %, more preferably 2 to 40 mass %.

Of these methods of carrying by the liquid phase method, preferably, the following method is used. The above-described inorganic porous carrier is immersed in an aqueous solution of metal salt (aqueous solution of metal salt mixture). In the aqueous solution of metal salt, metal salts (copper salt, alkali metal salt, and rare earth metal salt) containing the above-described active components are added to water as the solvent, and the metal salts are dissolved with the above-described concentration range. Also, an aqueous solution of metal salt containing a metal salt (one of copper salt, alkali metal salt, and rare earth metal salt) can be prepared separately, and the inorganic porous carrier can be immersed in each of the three aqueous solutions of metal salts.

In the method for producing a catalyst of the present invention, the carrier in which a copper compound, an alkali metal compound, and a rare earth metal element compound are dispersed is preferably calcined at 200 to 600° C. A more preferable lower limit value is 300° C., even more preferably 320° C. Meanwhile, a more preferable upper limit value for the calcining temperature is 400° C., even more preferably 390° C., particularly preferably 380° C. The calcining atmosphere is preferably an atmosphere containing oxygen. To be specific, the calcining is preferably carried out under an atmosphere of air or air flow. The carrier is presumably oxidated when the calcining is carried out in the presence of oxygen. The oxidated carrier tends to interact with chlorine derived from hydrogen chloride, and therefore it can be considered as preferable in oxidation of hydrogen chloride. The calcining conditions other than the temperature are that the calcining is carried out for 1 to 20 hours generally under a gas atmosphere including oxygen such as air.

An example of a preferable embodiment of the method for producing the catalyst for chlorine production of the present invention is described below. When the solvent in an amount of more than the pore volume remains in the catalyst after dispersion, the solvent has to be removed after the dispersion before charging it to the reactor, but when the amount of the solvent is the pore volume or less, it can be used as is for the reaction, or the solvent can be removed.

When the solvent of the solution used for introducing the metal components is to be removed, drying can be conducted solely, but calcining can further be carried out as well. Preferable drying and calcining conditions are as follows. The carrier impregnated with the metal solution is dried at 80° C. to 200° C. for 2 to 24 hours to remove free solvent such as water. More preferably, drying and calcining are carried out in an atmosphere containing no reductive gas and having an oxygen concentration of 15 to 95 vol % at 300 to 390° C. for 5 to 20 hours. More preferably, the temperature is 320 to 390° C.

The amount of the copper compound, alkali metal compound, lanthanoid compound, and carrier used depends on how these compounds are carried, but preferably the amount is such that the copper element, alkali metal element, and lanthanoid (rare earth metal element) contained in the produced catalyst is within the above-described range.

The shape of the catalyst produced with the method described above is not particularly limited, and it can be any shape. For example, it can be in powder, granular, pellet, spherical, or noodle form. The size can be any size as long as it can be charged in a reactor.

When the silica carrier is used as a carrier, commercially available ones can be used as is, and also they can be dried or calcined at a temperature of 30 to 700° C.

In addition to the above-described copper compound, alkali metal compound, and lanthanoid compound, when other compounds such as a palladium compound, iridium compound, chromium compound, vanadium compound, niobium compound, and alkaline earth metal compound are dispersed to the carrier as well, the addition method is not particularly limited, and they can be dispersed on the carrier along with the copper compound, alkali metal compound, and lanthanoid compound in a solution, or can be dispersed in the carrier separately beforehand or afterward. The catalyst for chlorine production containing components other than the above-described active components and carrier can be produced in this manner. When these other components are contained in the catalyst of the present invention, generally they are added in the range of 0.01 to 10 parts by mass relative to 100 parts by mass of the carrier calculated based on the metal elements.

[Method for Producing Chlorine]

The chlorine production method using the catalyst for chlorine production of the present invention is described next.

In the method for producing chlorine of the present invention, chlorine is produced by oxidation of hydrogen chloride with oxygen in a known fixed-bed reactor in the presence of the catalyst under a specific oxygen concentration range and temperature range.

It is known that the catalyst is suitable for a catalyst for producing chlorine by oxidation of hydrogen chloride with oxygen.

In the method for producing chlorine of the present invention, a material containing hydrogen chloride and oxygen is allowed to contact the above-described catalyst to cause reaction between hydrogen chloride and oxygen. The temperature for the reaction between hydrogen chloride and oxygen (that is, temperature for allowing the material containing hydrogen chloride and oxygen to contact with the catalyst) in the method for producing chlorine of the present invention is 280 to 370° C. Within this temperature range, the catalyst does not easily volatilize during the reaction between hydrogen chloride and oxygen. It also has a production speed necessary and sufficient for production of chlorine. Preferably, the lower limit value of the reaction temperature is 300° C., more preferably 320° C., even more preferably 340° C. Meanwhile, the upper limit value of the reaction temperature is 370° C., more preferably 365° C., even more preferably 360° C.

The reaction temperature of more than the above range may cause, as described above, volatilization of the catalyst component. The reaction is exothermic reaction, and is equilibrium reaction, and therefore a reaction temperature too high tends to cause reduction in the conversion rate. Meanwhile, with a reaction temperature too low, the catalyst activity tends to be reduced. The reduction in activity tends to occur particularly over time.

The reaction can be by any of batch or flow, to the extent that reaction between hydrogen chloride and oxygen occurs. The reaction is carried out by preferably flow, because characteristics of the fixed-bed catalyst can be utilized well.

The pressure at the time of the reaction is, in consideration of operativity, preferably an atmospheric pressure to about 30 atmospheric pressure. In view of preventing reduction in catalytic performance over time to be described later, the reaction pressure is preferably high. The specific preferable pressure range is 1 to 20 atmospheric pressure, even more preferably 1 to 10 atmospheric pressure. This pressure range is preferable because reduction in catalyst activity over time can be suppressed while the amount of material hydrogen chloride to be fed can be increased.

For the oxygen source of oxygen used in the reaction, air can be used as is. However, because the reaction is equilibrium reaction, the conversion rate does not reach 100%, and the unreacted hydrochloric acid and product chlorine may need to be separated, or variations in the oxygen concentration may occur. Therefore, the oxygen source is more preferably gas with a high oxygen content, and even more preferably pure oxygen containing no inactive nitrogen gas.

In the method for producing chlorine of the present invention, the oxygen concentration conditions are important, and to be specific, the oxygen concentration in the reaction atmosphere (that is, the oxygen concentration in the material containing hydrogen chloride and oxygen) is 45 to 75 vol %. A preferable lower limit value is 46 vol %, more preferably 48 vol %, even more preferably 50 vol %. Meanwhile, a preferable upper limit value is 73 vol %, more preferably 70 vol %, even more preferably 67 vol %.

With the oxygen concentration too low, the catalyst activity tends to decrease over time due to the reasons to be described later. Meanwhile, with the oxygen concentration higher than necessary, relative supply of hydrogen chloride becomes smaller, and therefore the chlorine production speed may decrease. In particular, the reaction temperature range of the present invention is a region that may cause reduction in reaction activities, and therefore increasing the oxygen concentration to a level too high has to be cautious.

The reaction temperature in the method for producing chlorine of the present invention is in a lower range for a copper catalyst, for the purpose of, for example, suppressing the catalyst volatilization, as described above. Meanwhile, the above-described oxygen concentration is in a high range. This is because of the above assumption. The inventors of the present invention believe that by increasing the oxygen concentration, the tendency to rapidly decrease the copper oxidation reaction velocity due to decrease in the reaction temperature can be suppressed. That is, the tendency to be easily affected by the temperature in the catalyst cycle, in which the copper element is reduced from divalent to monovalent in correspondence with oxidation reaction of hydrogen chloride, and then oxidated from monovalent to divalent with oxygen, can be suppressed.

With the above reaction conditions, stable chlorine production performance can be achieved with excellent catalytic performance of copper-based catalysts without involving the catalyst component volatilization and changes in activity over time. The reaction stability of the method for producing chlorine of the present invention can be evaluated by, for example, comparing the chlorine yield after 1,000 hours from the start of the reaction with the chlorine yield after 50 hours from the start of the reaction. In the method for producing chlorine of the present invention, the ratio of the chlorine yield after 1,000 hours to the chlorine yield after 50 hours from the start of the reaction (chlorine yield after 1,000 hours/chlorine yield after 50 hours) is preferably 0.93 or more, more preferably 0.95 or more, even more preferably 0.97 or more, particularly preferably 0.98 or more. A preferable upper limit is of course 1.00.

In the present invention, the hydrogen chloride is fed to the catalyst mass at a speed of, relative to 1 kg of the catalyst, generally 130 to 3000 L/h (based on 0° C.). A preferable lower limit value is 180 L/h, more preferably 250 L/h. Meanwhile, a preferable upper limit value is 2700 L/h, more preferably 2500 L/h.

The hydrogen chloride is fed to the catalyst volume at a speed of, generally relative to 1 L of the catalyst, 65 to 1500 L/h (based on 0° C.). A preferable lower limit value is 90 L/h, more preferably 130 L/h. Meanwhile, a preferable upper limit value is 1400 L/h, more preferably 1300 L/h.

The space velocity (based on 0° C.) represented by the total gas flow rate per the catalyst mass is preferably 300 to 10000 L/kg/h, and more preferably 400 to 8000 L/kg/h. With the space velocity too slow, the chlorine yield relative to the catalyst amount may be small and unpractical, and with the space velocity too fast, hydrogen chloride conversion efficiency may be reduced.

The method for producing chlorine of the present invention is an industrially suitable method for producing chlorine which suppresses, as described above, catalyst volatilization and reduction in activity over time. The method for producing chlorine is a suitable method particularly for flow continuous production method, in which catalyst replacement cycle span has more effects on productivity.

EXAMPLES

The present invention is further described in detail based on Examples and Comparative Examples below. However, the present invention is not limited to Examples. The specific numerical values in blending ratio (content ratio), property value, and parameter used in the following description can be replaced with upper limit values (numerical values defined with "or less" or "below") or lower limit values (numerical values defined with "or more" or "above") of corresponding numerical values in blending ratio (content ratio), property value, and parameter described in the above-described "DESCRIPTION OF EMBODIMENTS". The "parts" and "%" are based on mass unless otherwise specified.

Catalytic activity of the catalyst produced in Examples or Comparative Examples below was evaluated based on conditions below, unless otherwise specified.

A produced catalyst in an amount of 6 ml was charged into a 16 mmΦ fixed-bed reaction pipe. Hydrogen chloride and oxygen were fed to the fixed-bed reaction pipe at a predetermined temperature with a predetermined flow rate, thereby producing chlorine. The reaction outlet gas containing the produced chlorine was allowed to go through as is in 300 ml of a solution of potassium iodide (manufactured by KANTO CHEMICAL CO., INC., for oxidant measurement) dissolved in water with its concentration adjusted to be 0.2 mol/l for 8 minutes.

The amount of the produced chlorine was measured to determine the hydrogen chloride conversion rate with 0.1 mol/l of a sodium thiosulfate solution (manufactured by KANTO CHEMICAL CO., INC.).

Example 1

Granular silica (manufactured by FUJI SILYSIA CHEMICAL LTD., particle size 2 to 4 mmΦ, CARiACT Q15) having an average pore diameter of 12.3 nm, a specific surface area of 556 m$^2$/g, and a total pore volume of 1.7 ml/g was calcined in air at 500° C. for 2 hours (named silica carrier 1). A glass-made flask was charged with 30 g of water, 1.29 g of copper (II) chloride (manufactured by Wako Pure Chemical Industries, Ltd., special grade), 1.41 g of samarium chloride heptahydrate (manufactured by Wako Pure Chemical Industries, Ltd., special grade), and 0.67 g of potassium chloride (manufactured by Wako Pure Chemical Industries, Ltd., special grade) to prepare an aqueous solution, and 10.1 g of the silica carrier 1 was added thereto. The mixture was evaporated to dryness using a rotary evaporator at 80° C. The dried mixture was calcined in air at 330° C. for 3 hours, thereby producing a catalyst (named catalyst 1) having a mass ratio of Cu:K:Sm:SiO$_2$=5:3:5:87 (carried amount).

The catalytic activity was evaluated in the same manner as described above, except that hydrogen chloride was fed at 90 ml/min, oxygen was fed at 90 ml/min (oxygen concentration 50 vol %, space velocity of hydrogen chloride based on 0° C. was 900/h, constant), and the hot spot temperature was 360° C. The reaction was carried out continuously for 1,000 hours or more, and the chlorine yield was measured after 50 hours from the start of the reaction and after 1,000 hours from the start of the reaction. The evaluation results are shown in Table 1.

Example 2

A catalyst (named catalyst 2) with components carried at the same mass ratio was prepared in the same manner as in Example 1, except that lanthanoid was changed from samarium to praseodymium, and evaluated in the same manner as well.

Example 3

A catalyst (named catalyst 3) with components carried at the same mass ratio was prepared in the same manner as in Example 1, except that lanthanoid was changed from samarium to europium, and evaluated in the same manner as well.

Example 4

A catalyst (named catalyst 4) with components carried at the same mass ratio was prepared in the same manner as in Example 1, except that lanthanoid was changed from samarium to neodymium, and evaluated in the same manner as well.

Example 5

A catalyst (named catalyst 5) with components carried was prepared in the same manner as in Example 1, except that the mass ratio of Cu:K:Sm:SiO$_2$=5:3:5:87 was changed to 7:4.2:7:81.8, and evaluated in the same manner as well.

Example 6

A catalyst (named catalyst 6) with components carried at the same mass ratio was prepared in the same manner as in Example 1, except that alkali metal element was changed from potassium to sodium, and oxygen was fed at a speed of 180 ml/min (oxygen concentration 66.7 vol %), and evaluated in the same manner as well.

Examples 7 to 9 and Comparative Examples 1 to 3

Oxidation reaction of hydrogen chloride gas was carried out in the same manner as in Example 1, except that the conditions in the catalytic activity evaluation were changed as shown in Table 1.

Example 10

A catalyst (named catalyst 7) with components carried was prepared in the same manner as in Example 1, except that the mass ratio of Cu:K:Sm:SiO$_2$=5:3:5:87 was changed to 5:3:10:82, and evaluated in the same manner as well.

Example 11

A catalyst (named catalyst 8) with components carried was prepared in the same manner as in Example 1, except that the particle size of the granular silica was changed from 2 to 4 mmΦ to 1.2 to 2.4 mmΦ, and evaluated in the same manner as well.

TABLE 1

| no. | Catalyst composition ||||| Catalytic activity evaluation conditions |||||||
|---|---|---|---|---|---|---|---|---|---|---|---|---|
| | Copper (Cu) | Alkali metal (AM) | Rare earth element (REE) | Cu:AM: REE:SiO$_2$ | Carrier (SiO$_2$) diameter [mm] | Chlorine feeding speed [ml/min] | Oxygen feeding speed [ml/min] | Oxygen concentration [vol %] | Reaction temperature [° C.] | Reaction time [h] | Chlorine yield [%] | Chlorine yield ratio |
| Example 1 | Cu | K | Sm | 5:3:5:87 | 2-4 | 90 | 90 | 50.0 | 360 | 50 | 54.3 | 1.00 |
| | | | | | | | | | | 1000 | 54.1 | |
| Example 2 | | | Pr | | | | | | | 50 | 53.8 | 0.99 |
| | | | | | | | | | | 1000 | 53.5 | |
| Example 3 | | | Eu | | | | | | | 50 | 54.1 | 1.00 |
| | | | | | | | | | | 1000 | 54.0 | |
| Example 4 | | | Nd | | | | | | | 50 | 53.7 | 1.00 |
| | | | | | | | | | | 1000 | 53.5 | |
| Example 5 | Cu | K | Sm | 7:4.2:7:81.8 | 2-4 | 90 | 90 | 50.0 | 360 | 50 | 54.5 | 1.00 |
| | | | | | | | | | | 1000 | 54.4 | |

TABLE 1-continued

| no. | Catalyst composition | | | | | Catalytic activity evaluation conditions | | | | | | |
|---|---|---|---|---|---|---|---|---|---|---|---|---|
| | Copper (Cu) | Alkali metal (AM) | Rare earth element (REE) | Cu:AM: REE:SiO₂ | Carrier (SiO₂) diameter [mm] | Chlorine feeding speed [ml/min] | Oxygen feeding speed [ml/min] | Oxygen concentration [vol %] | Reaction temperature [° C.] | Reaction time [h] | Chlorine yield [%] | Chlorine yield ratio |
| Example 6 | Cu | Na | Sm | 5:3:5:87 | 2-4 | 90 | 180 | 66.7 | 360 | 50 | 58.3 | 0.99 |
| | | | | | | | | | | 1000 | 57.8 | |
| Example 7 | | K | | | | | | | | 50 | 62.5 | 1.00 |
| | | | | | | | | | | 1000 | 62.5 | |
| Example 8 | Cu | K | Sm | 5:3:5:87 | 2-4 | 150 | 150 | 50.0 | 360 | 50 | 53.8 | 1.00 |
| | | | | | | | | | | 1000 | 53.6 | |
| Example 9 | Cu | K | Sm | 5:3:5:87 | 2-4 | 90 | 180 | 66.7 | 320 | 50 | 23.1 | 0.99 |
| | | | | | | | | | | 1000 | 22.8 | |
| Example 10 | Cu | K | Sm | 5:3:10:82 | 2-4 | 90 | 90 | 50.0 | 360 | 50 | 60.7 | 0.98 |
| | | | | | | | | | | 1000 | 59.6 | |
| Example 11 | Cu | K | Sm | 5:3:5:87 | 1.2-2.4 | 90 | 90 | 50.0 | 360 | 50 | 63.5 | 1.00 |
| | | | | | | | | | | 1000 | 63.2 | |
| Comparative Example 1 | Cu | K | Sm | 5:3:5:87 | 2-4 | 90 | 90 | 50.0 | 380 | 50 | 71.3 | 0.92 |
| | | | | | | | | | | 1000 | 65.5 | |
| Comparative Example 2 | | | | | | | 60 | 40.0 | 360 | 50 | 53.6 | 0.81 |
| | | | | | | | | | | 1000 | 43.2 | |
| Comparative Example 3 | | | | | | | 90 | 50.0 | 270 | 50 | 5.2 | 0.62 |
| | | | | | | | | | | 1000 | 3.2 | |

When the reaction temperature is more than the predetermined upper limit of the present invention, the result showed the tendency to decrease the chlorine yield over time. The result also showed that the oxygen concentration below the predetermined lower limit of the present invention led to the same tendency.

When the reaction temperature (Hot Spot) is below the lower limit of the present invention, the chlorine yield significantly decreased. The decrease rate over time was also high.

Thus, the method for producing chlorine of the present invention exhibits excellent effects of a long-term, stable chlorine production.

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The method for producing chlorine of the present invention is suitably used in various industrial fields, and chlorine produced by the method is suitably used as an industrial material used for, for example, production of vinyl chloride and phosgene.

The invention claimed is:

1. A method for producing chlorine by oxidation of hydrogen chloride with oxygen in the presence of a catalyst in a fixed-bed reactor, comprising:
   allowing a material containing hydrogen chloride and oxygen to contact the catalyst in a temperature range of 280 to 370° C. wherein
   the material containing hydrogen chloride and oxygen has an oxygen concentration of 50 to 75 vol %,
   The catalyst contains an active component consisting of a copper element, and alkali metal element and a rare earth metal element, and
   the ratio of the chlorine yield after 1,000 hours to the chlorine yield after 50 hours from the start of the reaction is 0.93 or more.

2. The method for producing chlorine according to claim 1, wherein the hydrogen chloride is fed at a speed of 65 to 1500 L/h relative to 1 L of the catalyst.

3. The method for producing chlorine according to claim 1, wherein setting the mass of the catalyst as a whole as 100 mass %, the catalyst has a copper element content of 1.0 mass % or more, 12.0 mass % or less, the mass ratio of the copper element to the alkali metal element is in the range of 1:0.2 to 1:2.0, and the mass ratio of the copper element to the rare earth metal element is in the range of 1:0.2 to 1:3.0.

4. The method for producing chlorine according to claim 1, wherein the rare earth metal element contained in the catalyst is at least one selected from the group consisting of praseodymium, neodymium, samarium, and europium.

5. The method for producing chlorine according to claim 1, wherein the alkali metal element contained in the catalyst includes sodium and/or potassium.

6. The method for producing chlorine according to claim 1, wherein the catalyst containing a copper element, an alkali metal element, and a rare earth metal element is obtained by immersing an inorganic porous carrier inactive to chlorine and hydrogen chloride in an aqueous solution of metal salt of each or a mixture of the elements contained in the catalyst, and then the carrier immersed in the aqueous solution of metal salt was dried at 80 to 200° C. for 2 to 24 hours to remove free moisture content, and then further allowing the carrier immersed in the metal salt to stand in an atmosphere containing no reductive gas with an oxygen concentration of 15 to 95 vol % at 300 to 390° C. for 5 to 20 hours.

* * * * *